United States Patent [19]

Noda et al.

[11] 4,086,164

[45] Apr. 25, 1978

[54] METHOD OF DISPOSING OF WASTE WATER CONTAINING EMULSIFIED OIL

[75] Inventors: Mitsuhiko Noda; Kikuo Nomura, both of Osaka, Japan

[73] Assignee: Sumitomo Electric Industries, Ltd., Osaka, Japan

[21] Appl. No.: 665,480

[22] Filed: Mar. 10, 1976

[30] Foreign Application Priority Data

Mar. 10, 1975  Japan .................................. 50-29208

[51] Int. Cl.$^2$ ............................................. C02C 5/04
[52] U.S. Cl. ...................................... 210/46; 210/59; 210/67
[58] Field of Search ....................... 210/40, 42, 43, 46, 210/47, 67, 73 W, 59, 63 R

[56] References Cited

U.S. PATENT DOCUMENTS

| 3,279,603 | 10/1966 | Busse ........................................ 210/67 |
| 3,446,731 | 5/1969 | Harsh ....................................... 210/43 |

FOREIGN PATENT DOCUMENTS

2,339,143   6/1974   Germany ................................ 210/43

*Primary Examiner*—Thomas G. Wyse
*Attorney, Agent, or Firm*—Sughrue, Rothwell, Mion, Zinn and Macpeak

[57] ABSTRACT

A method of disposing of an oil containing emulsified waste water, for example, resulting from metal working processes, which comprises:

(a) separating the oil and water present in the oil containing emulsified waste water while maintaining the state of the emulsion, thereby concentrating the oil without breaking the emulsion;

(b) mixing the concentrate thus obtained at least with solid material filtered from the oil containing emulsified waste water during metal working, said concentrate being in a homogeneous, stable slurry state due to the action of a surfactant even when mixed with the solid material which contains water, unless said concentrate is dried;

(c) subjecting the resulting homogeneous, stable mixture to combustion.

11 Claims, 2 Drawing Figures

METHOD OF DISPOSING OF WASTE WATER CONTAINING EMULSIFIED OIL

BACKGROUND OF THE INVENTION

1. Field of the Invention

The present invention relates to a method for disposing of waste water containing emulsified oil.

2. Description of the Prior Art

Lubricating oil is frequently used in processes of working metals such as rolling, wire rod drawing, cutting, drilling, surface finishing, etc. The present invention relates to the disposal of oil containing emulsified waste water (emulsion waste liquid) which has been considered impossible to dispose of by known technique of separation by specific gravity differences or the like.

The disposal of oil containing emulsified waste water is thus a very important problem from the viewpoint of preventing environmental pollution.

Hitherto an oil containing emulsified waste water, for example, resulting from metal working processes, has been disposed of by separating the oil and water present in the oil containing emulsified waste water after breaking the emulsion with certain means, as disclosed in the report entitled "Effluent treatment of emulsion cleaners" (Metal Finishing Journal 18 (12), pp. 385 - 388 (1972).

However, conventional processes for disposing of such waste liquid comprise the step of independently breaking the emulsion, which decreases the efficiency of the system considerably and leads to high cost.

SUMMARY OF THE INVENTION

One object of the present invention is to provide an economical process for obtaining a stable, homogeneous mixture which can be burned in combustion apparatus by introducing oil containing emulsified waste water produced in working metal with a water soluble lubricating oil or a water soluble cutting fluid or the like and filtration dregs produced when solid foreign bodies which have found their way into the water soluble lubricating oil or water soluble cutting fluid or the like used in working metal are filtered by means of an apparatus for the separation of solids without breaking the emulsion.

To attain the above object, the present invention provides a mixture combustible in combustion apparatus, by concentrating the oil containing emulsified waste water to such a point that it becomes independently combustible or substantially independently combustible, which concentrated material is utilized as the sole oil component or as a partial oil component for the combustion, thus eliminating or decreasing the use of auxiliary fuel for combustion and lowering process cost.

Further, the surface active agent (or agents) which is present in the oil containing emulsified waste water from the beginning is utilized to obtain a stable, homogeneous slurry by mixing the oily substance obtained by the concentration of the oil containing emulsified waste water with the inorganic substance(s) obtained by filtering solid foreign bodies from the lubricating oil during metal working for the cyclic use thereof and with water.

Another object of the present invention is to provide a mixture which is capable of disposal, if desired, together with used filtration auxiliary from the apparatus used for the separation of solids or sludge or like inorganic substance during metal working.

The present invention is thus characterized in that oil containing emulsified waste water, such as a water soluble lubricating oil or a water soluble cutting fluid produced in working metal, is concentrated without breaking the emulsion by means of, for example, a physical-chemical apparatus which utilizes an ultra-filtration membrane or other device; the concentrate thus obtained is mixed, either with or without used filtration auxiliary from the apparatus for the separation of solids during metal working, at least with the filtration dregs of solid foreign bodies which have found their way into the water soluble lubricating oil or water soluble cutting fluid or the like used in working metal produced as a result of filtration by means of an apparatus for the separation of solids; and the resulting mixture is burned by means of an apparatus for combustion.

DETAILED DESCRIPTION OF THE INVENTION

A detailed description will now be made with reference to FIG. 1 which illustrates the present invention.

Figure 1:
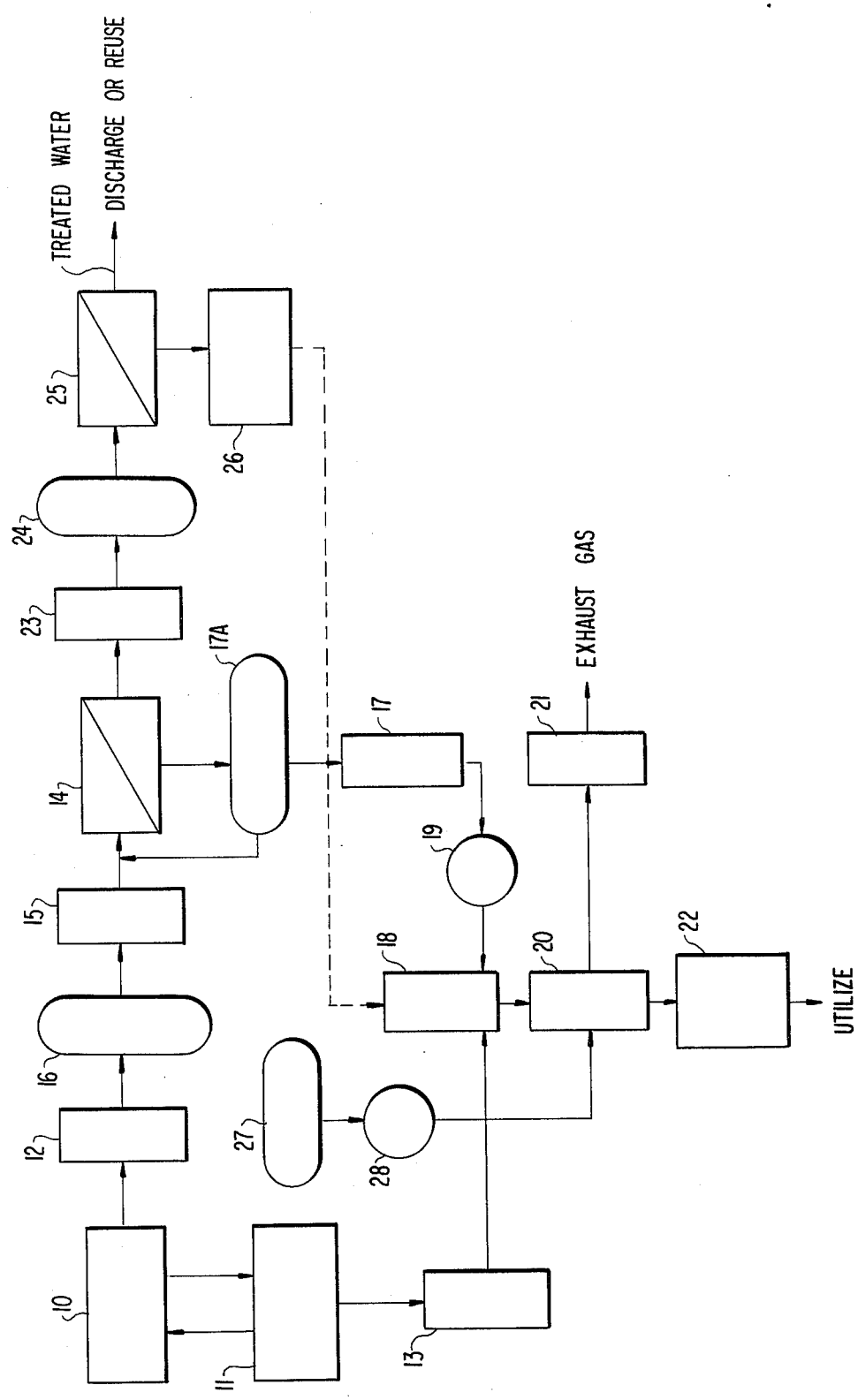
FIG. 1 is a flow chart of a process within the present invention.

As will be apparent to one skilled in the art, FIG. 1 illustrates a commercial scale process in accordance with the present invention which includes certain apparatus which, in all instances, is not mandatory but which is set forth as providing a process line of high versatility. For example, if pH regulator 16 is not utilized, for instance, because the pH of the material being processed does not harm the ultra-filtration membranes or an ultra-filtration separator is not utilized, then in such a case waste liquid tank 15 is not, of course, necessary.

Further, it should be apparent to one skilled in the art that in certain situations filtrate holding tank 23 is not necessary and, of course, for those situations where solids need not be filtered, solid filter 24 is not necessary. Assuming, further, that water treatment is not necessary for one reason or another, water treatment apparatus 25 also becomes optional, as does the concentrated waste liquid or sludge tank 26. For most practical commercial purposes, however, water treatment apparatus 25 and concentrated waste liquid or sludge tank 26 will be utilized.

As is later explained in detail, concentrate tank 17 essentially serves a holding function, and in those instances where close process control can be maintained, concentrate tank 17 is not necessary nor is concentrate regulator 17A as shown in FIG. 1.

Further, as will be clear from the heretofore offered discussion, fuel tank 27 is not always necessary, assuming a sufficient caloric content for the material to undergo combustion and in this case, fixed displacement pump 28 is also unnecessary.

While in theory the filtration dregs tank 13 is not necessary, as one skilled in the art will appreciate, to make maximum use of the filtration dregs such will generally be present.

Considering the ever increasing stringent requirements of pollution control, as a practical matter, exhaust gas treatment apparatus 21 will be commercially used, as will dregs disposal apparatus 22.

As one skilled in the art will appreciate, however, a filtration means, solid separation filter to form the filtration dregs, blender and combustion apparatus are, in all instances, mandatory components of the present invention for maximum process sufficiency.

Emulsified materials for use in a metal working process are dispersions of a fatty oil or fat, i.e., glycerin ester of a higher fatty acid such as oleic acid, linolic acid, linoleic acid, palmitic acid, etc., obtained by dispersing the fatty oil or fat in water in the presence of a surface active agent such as an anionic surface active agent, a cationic surface active agent or a nonionic surface active agent, with the particle size of the dispersed fatty oil or fat generally being from about 1 to about 15 $\mu$.

Such an emulsified lubricant serves as a coolant for preventing metallic objects to be processed and jigs and machine tools such as cutting tips, rolls, wiring dies or the like from being extremely heated in various steps, e.g., rolling, drawing, cutting, grinding, etc., as well as serving to prevent contact between the surfaces of two metallic objects in relative movement, thereby reducing friction and abrasion therebetween. If desired, aliphatic amines or salts thereof, or amides commonly used in the art can be added to the above emulsified material to prevent the oxidation of the surface of metallic objects to be processed. Also, conventional antiseptics can be added to the emulsified material to prevent the putrefaction thereof.

Common examples of commercially available emulsified lubricants include "Prosol #44" and "Prosol #48" for the hot rolling of aluminum, "Mercury D-16" for the drawing of copper and "Gulf Stainless Metal" for the drawing of copper (Trade names for products of Mobile Oil Corporation).

The composition of a typical original emulsified lubricant, e.g., a lubricant for drawing copper, is as follows:

|  | parts by weight |
| --- | --- |
| Vegetable oil | 28 – 18 |
| Animal oil | 5 – 15 |
| Nonionic surface active agent (e.g., polyethylene glycol) | 5 – 25 |
| Anticorrosives, antiseptics | 0.5 – 3 |
| Water | 40 – 60 |

Usually, the concentration of the lubricant composition in the waste water is diluted to 1/5 to 1/15 times that of the original emulsified material used.

Further, oil containing emulsified waste water as can be successfully processed in accordance with the present invention is described in many issued patents and applications, for example, in U.S. Pat. No. 3,496,104 (cold rolling of steel plate), in British patent specification No. 1,109,721 (a drawing), DT-AS No. 1,644,892 (cold rolling process) and the like.

It should thus be clearly understood that the starting material, i.e., the oil containing emulsified waste water which is processed in accordance with the present invention, is not unduly limited and includes such materials as are commonly encountered in the art.

It should be appreciated by one skilled in the art that the surface active agents utilized in the process of the present invention are not particularly limited, and include surface active agents as are conventionally used in the metal working art. For instance, examples of useful surface active agents include polyalkylene glycol oils for use in rolling copper, potassium salts of fatty acids for use in drawing copper, tertiary aliphatic amines for use in hot rolling aluminum, etc. Typical examples of surface active agents and amounts thereof are set forth below.

|  |  | Compounding Proportion (% by weight) |
| --- | --- | --- |
| (a) | Lubricant for rolling copper Polyethylene glycol oil (ester and/or ether of a fatty acid having 17 to 18 carbon atoms and 18 mols of ethylene oxide; total carbon number: 53 – 54) | 10 – 30 |
| (b) | Lubricant for drawing copper Soft potassium soap (potassium salt of a fatty acid having 16 to 18 carbon atoms) | 1 – 10 |
| (c) | Lubricant for hot rolling aluminum Triethanolamine | 0.2 – 1 |

The oil used in working a metal as indicated schematically by process step 10 of FIG. 1, i.e., the emulsion lubricating oil in FIG. 1, is used cyclically, that is, it is used for the repeated working of metal. During such working solid foreign bodies, such as pieces of the metal being worked, that find their way into the oil during use are removed by passing the emulsion oil through filtration auxiliaries such as canvas, clay, diatomaceous earth, etc., i.e., a conventional solid separation filter as indicated by numeral 11 in FIG. 1. The filtration dregs, i.e., after the filtration by means of a filtration auxiliary, are stored in a filtration dregs tank as indicated by numeral 13 in FIG. 1 together with the used filtration auxiliary, except for such types of auxiliary as canvas which are not capable of blending which cannot be mixed with the waste water concentrate, i.e., those which are not in the form of fine powders or which are not capable of being pulverized into fine powders. The filtration dregs tank is a tank wherein filtration dregs are temporarily stored and serves to adjust the amount of the filtration dregs (including filtration auxiliaries if any) supplied, which generally are formed in a relatively low amount of about 5% by weight based on the weight of the waste liquid and the frequency of whose formation is not always the same.

As the solids separator filter before the filtration dregs tank such apparatus as is commonly used in the art, e.g., a filter press, a belt filter, a centrifuge, a sand filter, etc., can be used, to remove materials other than the desired filtration dregs.

Despite such filtering the lubricating ability of the oil eventually becomes poor, and the emulsified oil is removed as waste from the metal working system, i.e., it is forwarded to the waste liquid tank as indicated by numeral 12 in FIG. 1. In waste liquid tanks 12 and 15 the waste liquid is homogenized to provide a homogeneous composition which makes the oil-water separation easier.

The filtration dregs which are utilized in accordance with the present invention are not especially limited and include those as are generally generated in metal working processes. However, as with any process, on a commercial scale certain types of filtration dregs are commonly encountered, and such are most preferred in accordance with the present invention; such materials include powders which are substantially free of any sharp edges and which have a maximum particle size of from about 50 $\mu$ to about 5 mm, e.g., powders of aluminum, iron and copper and oxides or hydroxides thereof.

A preferred compounding ratio for the filtration dregs is below about 0.3% by weight of the concentrated oil, based on the weight of the concentrated oil.

In a similar manner, the optional filtration auxiliary which is used in the present invention is not specifically limited, but, similarly, preferred materials do exist as are commonly encountered in the art. For instance, examples of preferred filtration auxiliaries include diatomaceous earth, anthracite, etc. It is preferred that the filtration auxiliaries be used in the form of a slurry comprising, e.g., from about 20 to about 50 parts by weight of waste diatomaceous earth (oil content: 35% by weight, water content: 10% by weight) and an oil concentration of from about 80 to about 50 parts by weight (oil content: 40% by weight).

The homogenized waste water contained in the waste liquid tank 12 is then forwarded to an ultra-filtration oil-and-water separation apparatus as indicated by numeral 14 in FIG. 1 via the waste liquid tank as indicated by numeral 15 in FIG. 1 after its pH is adjusted to 1 to 13, if necessary, preferably 4 to 9, in a pH regulator as indicated by numeral 16 in FIG. 1 (these pH ranges give a prolonged life to the ultra-filtration membrane), and is concentrated in the separation apparatus until its oil concentration measured by the concentration regulator 17A reaches the self combustion point without breaking the emulsion prior to charging the waste to the separation apparatus. The pH regulator can merely be a tank with valving means for adding an acid, e.g., hydrochloric acid, sulfuric acid, etc., or a base, e.g., sodium hydroxide, sodium carbonate, etc., to the system. The pH regulator is indispensable to prevent the deterioration of the membrane due to chemical aging, if a membrane is used which is susceptible to this effect, and when the semi-permeable membrane is formed of synthetic material such as cellulose acetate, aromatic polyamide, etc., the pH regulator is indispensable.

The ultra-filtration oil-and-water separator is a filtration apparatus of a special kind which essentially comprises one or more diaphragms having made of cellulose acetate, an aromatic polyamide, an aromatic polyhydrazide, etc., fabricated into the shape of a plate, tube or spiral, so that fine particles having a diameter of about 0.02 $\mu$ or more can be retained thereby. While not unduly limitative, generally ultra-filtration is conducted using an ultra-filtration membrane composed of acetylated cellulose at from about 5 kg/cm² to about 1 kg/cm² and at a temperature of from about 0° C to about 35° C.

An example of such an apparatus which is commercially available is: FRO type Ultra-filtration Unit using HFA membrane or HFD membrane made by Abcor Inc. (U.S.A.). As will be appreciated by one skilled in the art, the exact ultra-filtration apparatus chosen is not overly important.

It should be noted that ultra-filtration has been disclosed above as the separating technique utilized. It should be apparent to one skilled in the art, however, that the present invention is not limited to the use of ultra-filtration separation techniques at this point of the invention, and other equivalents thereto can be utilized with success, though ultra-filtration is preferred. For example, separation of the oil and water present in the oil containing emulsified waste water being processed in accordance with the present invention can also be conducted by other methods such as electrolysis, centrifuging, for example, ultra-centrifuging, by chemical treatment, for example, by coagulation, and the like.

The emulsified waste water that has been concentrated is then passed to a concentrate tank as indicated by numeral 17 in FIG. 1, which serves the function of a simple holding tank, while the filtrate resulting from the oil-water separation is passed a filtrate holding tank 23. The filtrate holding tank is used for homogenizing the filtered waste liquid formed from the ultra-filtration step. This tank also serves as a buffer tank for use in the case where there is a difference in capacity or capability between the water treating apparatus 25 or where the function of the apparatus is reduced.

The solids filter 24 following the filtrate holding tank removes foreign bodies introduced into and contaminating the filtrate in the filtrate holding tank as well as to remove flocs of microorganisms which may grow in the filtrate holding tank. Usually this apparatus is provided with a cartridge filter capable of catching particles having a particle size of from about 1 $\mu$ to about 5 $\mu$.

The water treating apparatus (reverse osmosis apparatus) 25 is used in the case where the filtrate of the ultra-filtration apparatus does not meet the waste water standards applicable in the region where the plant concerned is located. The reverse osmosis apparatus is operated, for example, at a temperature of from about 20° to about 30° C at a pressure of from about 24 to about 28 kg/cm² and with a removal rate of from about 95 to about 97% (the original COD of about 1,400 ppm being reduced to about 50 ppm), or at a temperature of about 25° C at a pressure of about 26 kg/cm² with a removal rate of from about 93 to about 97% (the original COD of about 2,300 ppm being reduced to about 100 ppm). As one skilled in the art will appreciate, the load imposed on the water treating apparatus will vary, depending upon the standards in the region involved, and, in many instances, the water treating apparatus will not be necessary.

Since, the oil content of the concentrate affects the caloric value of the concentrate greatly and the quality of the filtrate charged into the water treating apparatus is lowered as the degree of concentration is elevated, a concentrate regulator 17A as shown in FIG. 1 is provided to measure the efficiency of the total system. In conducting oil-water separation by means of ultra-filtration the liquid to be disposed of is flowed in the form of a turbulent flow parallel to the surface of the membrane to augment the permeability of the membrane as well as to prevent the clogging of the pores thereof, so that it is sometimes necessary for the liquid to be recycled from the concentrate regulator to just before the oil-water separator. The amount of filtrate passing through the ultra-filtration membrane is very small as compared with that of the feed liquid, e.g., about 4 to about 0.5 l/min of the filtrate to 120 l/min of the feed. Thus, a recycle operation where the concentrate from the ultra-filtration apparatus is recycled to just before the oil-water separator can be conducted until the desired degree of concentration, i.e., about 35%, is reached, and fresh feed liquid in an amount equivalent to that of the filtrate removed is supplied from the waste liquid tank 15. Whether or not the desired degree of concentration is reached is determined by the concentrate regulator, and, when it is reached, the recycle operation is stopped and then the concentrate is transferred into the concentrate tank.

Following the oil-water separation referred to, whether the separation be accomplished by ultra-filtration or by other techniques, most preferred results in accordance with the present invention are obtained when the degree of concentration following oil-water separation is as follows:
  Oil content: about 20 to about 60% by weight;
  Water content: about 80 to about 40% by weight;
  Surface active agent: below about 1% by weight (usually substantially 0% by weight)

The filtration dregs and used filtration auxiliary from the apparatus for the separation solids during metal working, mentioned above, and the concentrated waste mentioned above are both forwarded to a blender as indicated by numeral 18 in FIG. 1, e.g., by a displacement pump as indicated by numeral 19 in FIG. 1, and formed into a homogeneous slurry, the blender typically being a conventional kneader, mill or mixer.

In the case that the filtration dregs and the used filtration auxiliary (if present) at this point are muddy, i.e., they have the appearance of a mud and contain about 90% by weight or more water, a prescribed quantity of a liquid combustible material, such as a waste oil, a waste solvent, etc., is added from the fuel tank as shown by numeral 27 in FIG. 1 by way of a fixed displacement pump as shown by numeral 28 in FIG. 1 to convert the mud into a slurry to increase its caloric content prior to combustion. For example, with such a muddy material, from about 50 to about 300 parts by weight, preferably from about 80 to about 270 parts by weight, of a liquid combustible material, such as a waste oil, e.g., machine oil, kerosene, heavy oil, crude petroleum, a waste solvent, e.g., cellosolve acetate, cresol (m- or p-), naphtha, etc., can be added to 100 parts by weight of the inorganic sludge containing 90% by weight of water.

Even in the case where the water contained in the filtration dregs and used filtration auxiliary (if present) does not exceed about 40% by weight, it is necessary to add a liquid combustible material if they themselves contain little combustible ingredients, e.g., contain about 1.7% by weight or less of combustible ingredients in 100 parts by weight of the sludge containing about 40% by weight or less of water, i.e., in the case where the caloric value of the mixture of filtration dregs and filtration auxiliaries does not reach about 4,500 Kcal/kg, waste oil is added to the mixture so as to obtain at least the above caloric value.

In any of the above mentioned cases, the system of the present invention uses concentrated emulsified waste water in which a surface active agent(s) is present so that the mixture of inorganic components, water and combustible materials is easily obtained and made homogeneous and supply thereof to the combustion apparatus as indicated by numeral 20 in FIG. 1 can be conducted in a stable fashion because separation of the components does not occur after the mixture is formed.

In the combustion apparatus a homogeneous slurry-form mixture is atomized using a conventional rotary sprayer and the thus obtained spray or aerosol containing very finely divided combustible material of a particle size of from several ten to hundred and several ten microns is burned (therefore, the combustibles can be burned in a short period of time with high combustion efficiency). The details of one such a combustion apparatus are described in U.S. Patent Application Ser. No. 524,909. The combustion apparatus is operated at a temperature of from about 850° C to about 1,250° C, preferably from about 1,050° to about 1,150° C at a pressure slightly lower than atmospheric, e.g., lower by about 10 mmHg, in an oxidizing atmosphere, usually in air, for a retention time of from about 0.1 to about 5 seconds, preferably from about 0.5 to about 2 seconds.

Following combustion in the combustion apparatus the exhaust gas is discharged to an exhaust gas treating apparatus as indicated by numeral 21 in FIG. 1, and any solid residue is passed to a disposal apparatus as indicated by numeral 22 in FIG. 1 and is either disposed of or utilized, for example, as a compounding material for cements.

The dregs disposal apparatus is provided at the bottom of the combustion apparatus and is essentially a hopper, the bottom plate of which can be opened to pass the dregs down into a box positioned below the hopper for disposal. The exhaust treatment apparatus comprises a cooling tower for the exhaust gas, a scrubber and a dust remover (cyclone and/or bag filter or electrostatic precipitator), although all of this exhaust treatment apparatus is not necessary.

The filtrate from the ultra-filtration separation apparatus in the above described system is passed to a filtrate holding tank as indicated by numeral 23 in FIG. 1 and then through a solids filter as indicated by numeral 24 in FIG. 1, a water treatment apparatus as indicated by numeral 25 in FIG. 1, such as reverse osmosis apparatus, for example, using the apparatus as described in U.S. Pat. No. 3,701,431, etc., and the treated water thus obtained is discharged or re-used, for example, re-used as a diluent for cutting oils, rolling oils, etc. Prior to re-use, if desired, the concentrated waste liquid or sludge can be retained in a concentrate waste liquid or sludge tank as indicated by numeral 26 in FIG. 1. On the other hand, the thick waste liquid which is obtained when the reverse osmosis apparatus is used (in this case no sludge is formed) or sludge resulting from activated sludge treatment wherein filtrate from the ultra-filtration apparatus is further treated is forwarded to the afore-mentioned blender together with the afore-mentioned filtration dregs and concentrated liquid (with or without the addition of used auxiliaries), and is burned in the combustion apparatus.

According to the present invention, sludge from processes from other systems may be introduced into the blender instead of the afore-mentioned sludge. For example, sludges can be used which are produced in a rolling or wire drawing plant at the time of neutralizing a waste liquid discharged in the step of washing materials with an acid to wash or descale the metal surface as is commonly employed after hot rolling or in the surface treatment of metals. This kind of sludges usually contain from about 30 to about 85% by weight of water.

In the afore-mentioned example of one embodiment of the present invention, oil containing emulsified waste water is concentrated and the concentrate obtained is mixed with filtration dregs and used filtration auxiliary. It should be understood, however, that while the concentrate is mixed with filtration dregs, it is not required that used filtration auxiliary always be present in the mixture. On the other hand, it is also contemplated to be within the scope of the present invention to have other substances than those mentioned above added to the mixture.

Figure 2:
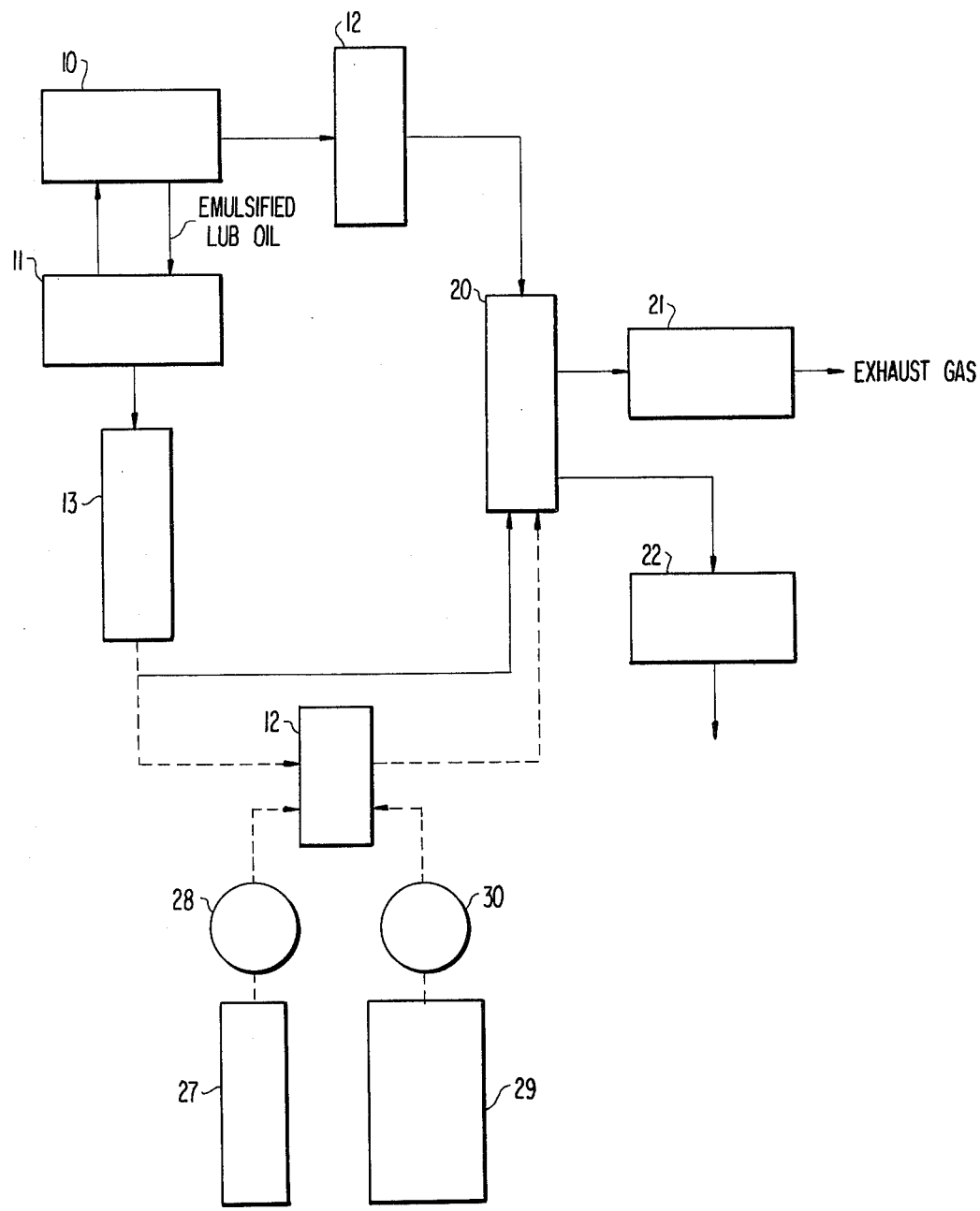
FIG. 2 is a flow chart of a typical prior art process.

According to prior art processes for disposing of oil containing emulsified waste liquid produced in the working of metals, the waste liquid is disposed of by burning as it is in a combustion furnace at high temperature, as shown by the solid lines in FIG. 2, i.e., without concentration as in the present invention. In FIG. 2, like numerals to those in FIG. 1 are utilized to identify like elements.

The filtration dregs produced by the solids separation filter during the working of metals, and used filtration auxiliaries, are also disposed of by burning in a combustion furnace at high temperature, as shown by the solid lines in FIG. 2. Alternatively, the afore-mentioned filtration dregs and used filtration auxiliaries are mixed with auxiliary combustibles and surface active agents, for example, by feeding surface active agents from the surface active agent tank 29 by way of fixed displacement pump 30 to blender 18, and are disposed of by burning in a combustion furnace as shown by the broken lines in FIG. 2.

In consequence of the above, the method heretofore employed by the art has the following shortcomings:

(1) A large quantity of fuel has to be used for the disposal by burning because an oil containing emulsified waste liquid whose oil content is very low (usually 10% by weight or less) is directly burned for disposal.

(2) Water containing filtration dregs and used filtration auxiliaries are introduced into a combustion furnace and burned as they are. Since water containing filtration dregs and used filtration auxiliaries consists of inorganic substances and water, it is necessary to keep them in an atmosphere at high temperature for long periods of time, so that a large quantity of fuel is required and the disposal capacity is low.

(3) If fuel is blended with water containing filtration dregs and used filtration auxiliary, they separate and form a non-homogeneous mixture; in consequence, it is necessary to use a surface active agent.

If the afore-described method of the present invention is employed, however, the waste liquid is concentrated and then blended with filtration dregs and used filtration auxiliaries and burned in a combustion apparatus. The method of this invention, therefore, has the following advantages:

(i) Filtration dregs and filtration auxiliaries usually contain about 60% by weight or more of water. A surface active agent is necessary when fuel (including auxiliary combustibles) is mixed therewith. However, since one or more surface active agents is inherently contained in oil containing emulsified waste water, a concentrate of such oil containing emulsified waste water which serves as fuel can be uniformly blended with water containing filtration dregs and used filtration auxiliaries (sometimes also dehydrated cakes from other water treatments, i.e., dehydrated cakes obtained by dehydrating the above described sludges other than those from the activated sludge treatment or excessive sludge from a sewage disposal process to about a 30% by weight water content using a filter press or a dryer) and can yield a slurry-form mixture of good storage stability.

(ii) The concentrated oil containing emulsified waste water itself is combustible and can be used as fuel, providing excellent process economy.

(iii) In consequence, if the stable, homogeneous slurry-form mixture of the afore-mentioned inorganic substances, water and oil is ignited after it is converted into fine particles by means of a sprayer, it is possible to burn the oil content completely, only the inorganic substances remaining. It is also possible to effect the sintering of inorganic substances including harmful heavy metals which calls for high temperatures of 900° C or more in an economical way, keeping the quantity of auxiliary combustibles to a minimum by selecting a proper degree of concentration for the oil containing emulsified waste water. Although the proper degree of concentration, of course, varies widely depending upon factors such as the volume or capacity of the furnace, the content of solids of slurry to be burned, etc., however, a usually employed degree of concentration is such that the caloric value of a mixture of the slurry and auxiliary fuel is from about 4,500 to about 6,000 Kcal/kg.

Examples of the prior art method heretofore described and the method of the present invention will now be presented to further illustrate the practice and advantages of the present invention.

Comparative Example — Prior Art Method

A homogeneous slurry consisting of 100 weight parts of filtration dregs and used filtration auxiliaries (water content: 80% by weight) and 100 weight parts of a cutting waste liquid (oil content: 0.8% by weight) was sprayed at a rate of 35 kg/min into a combustion furnace and sintered at 1,100° C with the addition of Fuel Oil A to assist combustion. The residual carbon in the resulting clinker was 0.5% by weight or less and the clinker was free from any oil. The quantity of Fuel Oil A used as a combustion aid was 40 kg/min.

EXAMPLE 1

Method of the Present Invention

Lubricating oil waste liquid from metal rolling (oil content: 5% by weight; oil was Mobile Prosole #48 (trade name for a product of Mobile Oil Corporation) (balance water); pH 8.7; particle diameter of oil: 3 to 12 $\mu$) was homogenized and then concentrated by means of a tubular ultra-filtration membrane of cellulose acetate until its oil content reached 52% by weight. The ultra-filtration apparatus used (ABCOR FRO-1511(trade name for the product of Abcor Inc.)) was provided with a tubular ultra-filtration membrane of cellulose acetate (HFA 251 (trade name for the product of Abcor Inc.)) and was operated at a temperature of 30° C at an inlet pressure of 3.5 kg/cm$^2$ and an outlet pressure of 1.5 kg/cm$^2$.

100 weight parts of waste diatomaceous earth (30 to 40 $\mu$) which had been used for the filtration and removal of foreign bodies from the lubricating oil used for metal rolling which had been used cyclically in the metal rolling process (inorganic substances whose principal component was silicic anhydride 55% by weight; water 10% by weight; oil 35% by weight; 2 parts by weight of foreign bodies to 100 parts by weight of diatomaceous earth) and 100 weight parts of the concentrated waste liquid described above were stirred together in a blender to yield a homogeneous slurry. Blending was conducted with each 50 kg of the mixture at a speed of 300 rpm for 15 minutes using a kneader ("Speed Kneader SK-250" (trade name for the product of Seiko Engineering Co., Ltd.)). This slurry was sprayed and sintered with Fuel Oil A as a combustion aid (5 parts by weight of Fuel Oil A to 100 parts by weight of the slurry), as in the Comparative Example heretofore employed (spraying was performed at an atomizing rate of 100 kg/hr with the rotary sprayer being rotated at 10,000 rpm to yield a spray having particle size of from about 50 to about 500 $\mu$). The combustion was conducted at 1,100° C at reduced pressure (10 mmHg lower than atmospheric) in air for 1 hour with the retention time being 1 second using an AWR type spray burner (U.S. Pat. Application Ser. No. 524,909), a product of Sunray Reinetsu Co., Ltd. The residual carbon in the clinker was 0.5% or less and no combustible constituents remained. The clinker was a dark brown, porous, rock-like substance having a surface luster which accumulated at the bottom of the furnace. The clinker was good enough for use as an ingredient of cement for construction purposes as described below. The slurry mixture and combustion auxiliary were separately atomized using separate atomizers. The combustion auxiliary was burned at the time of starting the operation to elevate the furnace temperature from ambient temperature up to 1,150° C, at which point spraying of the combustion auxiliary was stopped and then only the slurry was sprayed. With the concentrate and oil content of the diatomaceous earth alone the combustion was able to be continued and the furnace temperature was maintained at about 1,100° C. However, in the case where the furnace temperature was lowered below 1,000° C with the slurry alone, the combustion auxiliary was again sprayed to raise the temperature up to 1,150° C. 5 kg of the combustion auxiliary was used for burning 100 kg of the slurry for the operation period of 1 hour.

After any solids were filtered from the filtrate resulting from the ultra-filtration step, the resulting liquid was subjected to reverse osmosis at 28° C at a pressure of an inlet pressure of 28 kg/cm$^2$ and conversion rate of 65% using the reverse osmosis apparatus "DuPont Permeator ROE-D4-½" (trade name for a product of DuPont Inc.) provided with a membrane "Permasep B-9" (trademark for a product of DuPont Inc.); the concentrated product resulting from the reverse osmosis can, if desired, be forwarded to the blender for combustion; in this Example, for purposes of simplicity, it was not so forwarded.

As indicated above, the clinker could be used as an ingredient of cement for construction purposes, if desired. Use, typically, is as follows. The clinker can be pulverized into powder of a particle size of about 1 to 3 mm and the powder mixed with a cement and other ingredients in the following compounding ratio:

| Cement | 14% by weight |
| Fine aggregate | 11% by weight |
| Coarse aggregate | 44% by weight |
| Pulverized clinker | 11% by weight |
| Water | 20% by weight |

The thus obtained concrete had a compressive strength of about 190 kg/cm$^2$.

EXAMPLE 2

Method of the Present Invention

In this Example, the same materials, apparatus and operating conditions as were used in Example 1 were used, unless indicated as different in the following paragraph.

A slurry-form mixture consisting of 200 weight parts of the waste oil containing diatomaceous earth of Example 1 and 100 weight parts of concentrated waste water from a rolling process with an oil content of 38% by weight was mixed in the earlier described blender with 50 weight parts of Fuel Oil A to yield a homogeneous slurry. No sedimentation of inorganic substances was observed when the slurry was left standing for 24 hours, and combustion could be effect as in Example 1 with similar results.

EXAMPLE 3

Method of the Present Invention

The homogeneous slurry obtained in the above Example 2 was fed through a conventional screw feeder into a rotary kiln produced by Kansai Hoon Co., Ltd. operated at a rotating speed of 0.5 rpm, which was pre-heated using Fuel Oil A up to 950° C and was sintered under the conditions of 1,750 kg/hr (together with 280 kg/hr of the combustion auxiliary) at a temperature of 900° C and at a pressure lower than atmospheric by 20 mmHg in an atmosphere to obtain ash, i.e., reclaimed diatomaceous earth of a grayish white color consisting of soft, porous particles closely resembling a ball and having a particle size of from about 0.5 to about 5 mm which contained organic substance(s) in an amount of 0.5% by weight or less was obtained. This reclaimed diatomaceous earth was crushed and used for the filtration of lubricating oil for aluminum hot rolling, and was of sufficient quality for that purpose.

The present invention has been found to be especially useful for the situations mentioned below, though its usefulness should by no means be restricted to such situations.

Situations where the oil containing emulsion waste liquid contains lubricating oil of vegetable origin and/or has little free oil, and the oil concentration of a concentrate thereof is about 35% by weight or more, so that it is capable of burning by itself; with such a material it is possible to effect oil-and-water separation using a semi-permeable membrane.

Situations where a mixture of the oil containing diatomaceous earth and sludge in such a proportion as is used practically contains water not in excess of about 30% by weight and combustible oil in an amount of not less than about 5% by weight; such a material can be sintered so harmful heavy metals and are rendered non-pollutant by heating to a high temperatures.

Situations where about 80% by weight or more of the inorganic constituents is silicic anhydride.

While the invention has been described in detail and with reference to specific embodiments thereof, it will be apparent to one skilled in the art that various changes and modifications can be made therein without departing from the spirit and scope thereof.

What is claimed is:

1. A method of disposing of oil containing emulsified waste water from metal working processes which comprises concentrating an oil containing emulsified waste water, mixing the concentrate obtained at least with a filtration auxiliary which contains filtration dregs of solid foreign bodies resulting from the working of metals to form a substantially independently combustible mixture, and burning the resulting mixture, said emulsified waste water remaining in an emulsified state after concentration, said filtration auxiliary comprising a substance used in filtering solid foreign bodies from the oil when said emulsified oil is recycled in the metal working processes.

2. The method of claim 1, wherein that a combustible liquid is further added when said concentrate is mixed with at least said filtration dregs.

3. The method of claim 1, wherein a sludge or like inorganic substance is added to said concentrate.

4. The method of claim 1, wherein said concentrate further comprises solid foreign bodies resulting from the working of metals.

5. The method of claim 4, wherein said concentrate is obtained by ultra-filtration.

6. The method of claim 1, wherein said concentrate further comprises one or more surface active agents.

7. The method of claim 6, wherein said concentrate comprises: from 20 to about 60% by weight of oil, from about 80 to about 40% by weight of water, and below about 1% by weight of one or more surface active agents.

8. The method of claim 7, wherein said filtration dregs have a maximum particle size of from about 50 $\mu$ to about 5 mm and are present in an amount below about 0.3% by weight of the concentrate.

9. The method of claim 8, wherein the caloric value of the material subjected to combustion is from about 4,500 to about 6,000 Kcal/kg.

10. The method of claim 1, wherein said filtration auxiliary comprises clay or diatomaceous earth.

11. A method of disposing of an oil containing emulsified waste water resulting from metal working processes which comprises:
(a) separating the oil and water present in the oil containing emulsified waste water while maintaining the state of the emulsion, thereby concentrating the oil without breaking the emulsion;
(b) mixing the concentration thus obtained at least with the filtration dregs filtered from the oil containing emulsified waste water during metal working, said concentrate being in a homogeneous, stable slurry state due to the action of a surfactant even when mixed with the solid material which contains water, unless said concentrate is dried; and
(c) subjecting the resulting homogeneous, stable mixture to combustion.

* * * * *